United States Patent
Conley et al.

(10) Patent No.: US 8,723,674 B2
(45) Date of Patent: May 13, 2014

(54) SENSORY TRACKING OF INVENTORY

(75) Inventors: Louis S. Conley, Sewickley, PA (US);
William B. Pattison, Mars, PA (US);
Kirk Young, Pittsburgh, PA (US)

(73) Assignee: Aesynt Incorporated

(*) Notice: Subject to any disclaimer, the term of this patent is extended or adjusted under 35 U.S.C. 154(b) by 305 days.

(21) Appl. No.: 13/041,800

(22) Filed: Mar. 7, 2011

(65) Prior Publication Data

US 2012/0229279 A1 Sep. 13, 2012

(51) Int. Cl.
*G08B 13/14* (2006.01)
*G08B 21/00* (2006.01)

(52) U.S. Cl.
USPC .............. 340/568.1; 340/686.1; 340/572.1; 340/5.92; 235/385

(58) Field of Classification Search
USPC ......... 340/522, 521, 5.2, 5.92, 539.1, 539.13, 340/568.1, 545.6, 572.1–572.9, 999, 686.1, 340/686.6; 235/381, 382, 385
See application file for complete search history.

(56) References Cited

U.S. PATENT DOCUMENTS

| | | | |
|---|---|---|---|
| 5,905,653 A | 5/1999 | Higham et al. | |
| 6,973,371 B1 | 12/2005 | Benouali | |
| 7,175,081 B2* | 2/2007 | Andreasson et al. | 235/385 |
| 7,203,571 B2 | 4/2007 | Kirsch et al. | |
| 7,250,865 B2* | 7/2007 | Maloney | 340/572.1 |
| 8,342,400 B1* | 1/2013 | Reese | 235/385 |
| 2006/0071774 A1* | 4/2006 | Brown et al. | 340/522 |

* cited by examiner

*Primary Examiner* — Anh V La
(74) *Attorney, Agent, or Firm* — Alston & Bird LLP (57) ABSTRACT

Systems, methods, apparatus, and computer program products are provided for tracking the inventory of items. In one embodiment, a compartment comprises a plurality of sensors disposed proximate a surface of the compartment. A container storing items can be disposed above the surface of the compartment. Then, the sensors can detect the presence or absence of items from the container.

21 Claims, 7 Drawing Sheets

SENSORY TRACKING OF INVENTORY

BACKGROUND

In various settings, automated medication dispensing carts (ADCs), for example, exist for use in hospital operating rooms for dispensing medications to patients during surgery. For safety reasons, inventory control, and/or billing purposes, it may desirable to be able to determine (a) when a medical provider (e.g., anesthesiologist) administers a medication to a patient and (b) the type of medication administered. Such a need may be complicated in an anesthesia environment because medical providers (e.g., anesthesiologists) often need to access medications very quickly, so going through elaborate procedures to indicate what medications the medical provider (e.g., anesthesiologist) has administered can be problematic. Thus, a need exists for an efficient system that would allow quick access to needed items (e.g., medications) that could automatically sense whether the items (e.g., medications) are present in or absent from, for example, a storage location (e.g., ADC).

BRIEF SUMMARY

In general, embodiments of the present invention provide systems, methods, apparatus, and computer program products for tracking the inventory of a plurality of items.

In accordance with one aspect, a method for tracking the inventory of a plurality of items is provided. In one embodiment, the method comprises (1) providing a compartment comprising a plurality of sensors disposed proximate a surface of the compartment; (2) disposing a container above the surface, wherein the container (a) stores a plurality of items and (b) is supported by the compartment; and (3) receiving an indication that at least one sensor of the plurality of sensors detected the absence of at least one of the plurality of items from the container.

In accordance with yet another aspect, a computer program product for tracking the inventory of a plurality of items is provided. The computer program product may comprise at least one computer-readable storage medium having computer-readable program code portions stored therein, the computer-readable program code portions comprising executable portions configured to receive an indication that at least one sensor of a plurality of sensors detected the absence of at least one of a plurality of items from a container, wherein (a) a compartment comprises the plurality of sensors disposed proximate a surface of the compartment, and (b) a container is disposed above the surface, the container (i) storing the plurality of items and (ii) being supported by the compartment.

In accordance with yet another aspect, an apparatus comprising a compartment with a plurality of sensors disposed proximate a surface of the compartment, wherein (a) a container is disposed above the surface and (b) the container (i) stores a plurality of items and (ii) is supported by the compartment. The apparatus may also comprise at least one processor and at least one memory including computer program code. In one embodiment, the at least one memory and the computer program code may be configured to, with the processor, cause the apparatus to at least receive an indication that at least one sensor of the plurality of sensors detected the absence of at least one of the plurality of items from the container.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Methods, Apparatus, Systems, and Computer Program Products

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Exemplary Architecture and Operation

Figure 1:
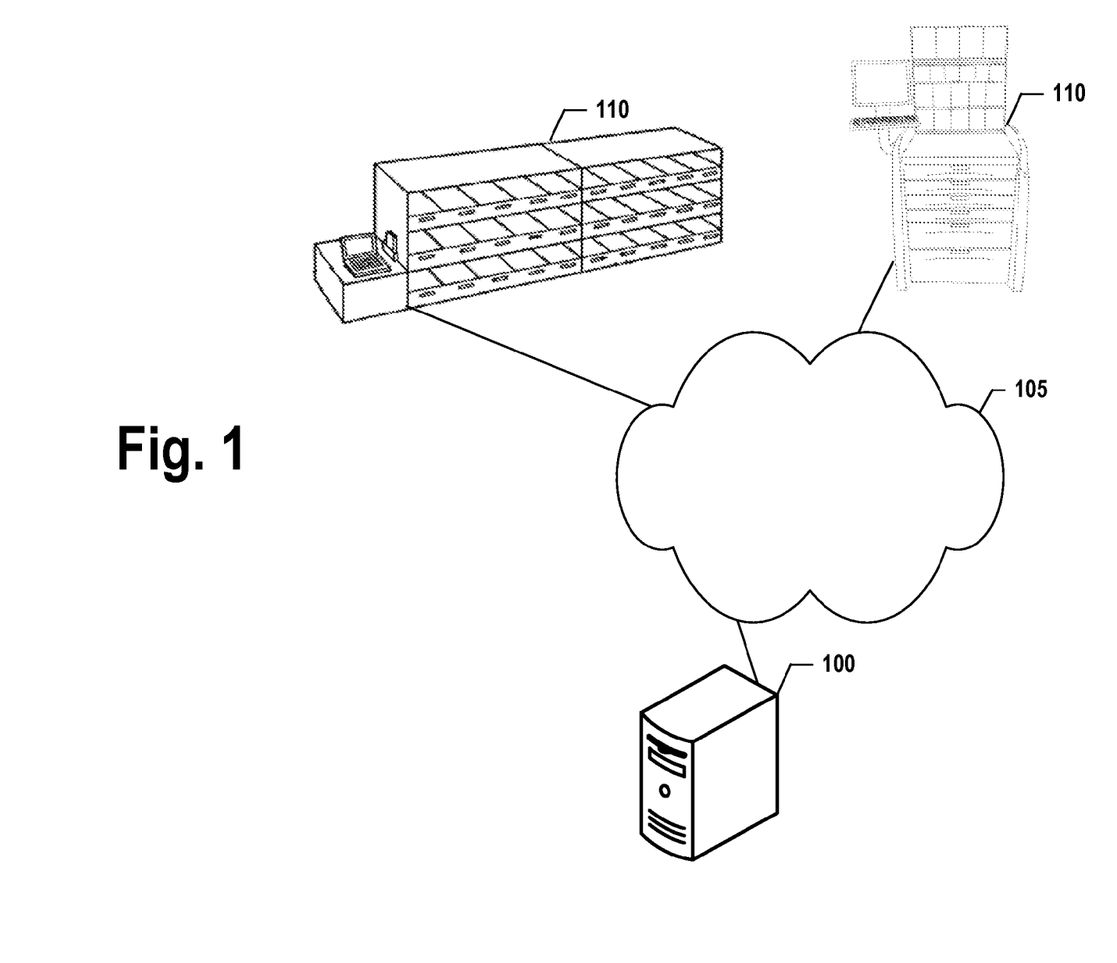
FIG. 1 is an overview of a system according to various embodiments of the present invention.

FIG. 1 provides an illustration of a system that can be used in conjunction with various embodiments of the present invention. As shown in FIG. 1, the system may include a server 100, a network 105, and one or more storage locations 110 (and corresponding computing devices, such as the one shown in FIG. 3). Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates the various system entities as separate, standalone entities, the various embodiments are not limited to this particular architecture.

At least some of the following examples may be described in a health care setting. However, as will be recognized, their application is not limited to such an environment. In fact, embodiments of the present invention may be applied to most any environment for tracking the inventory of items.

1. Exemplary Server

Figure 2:
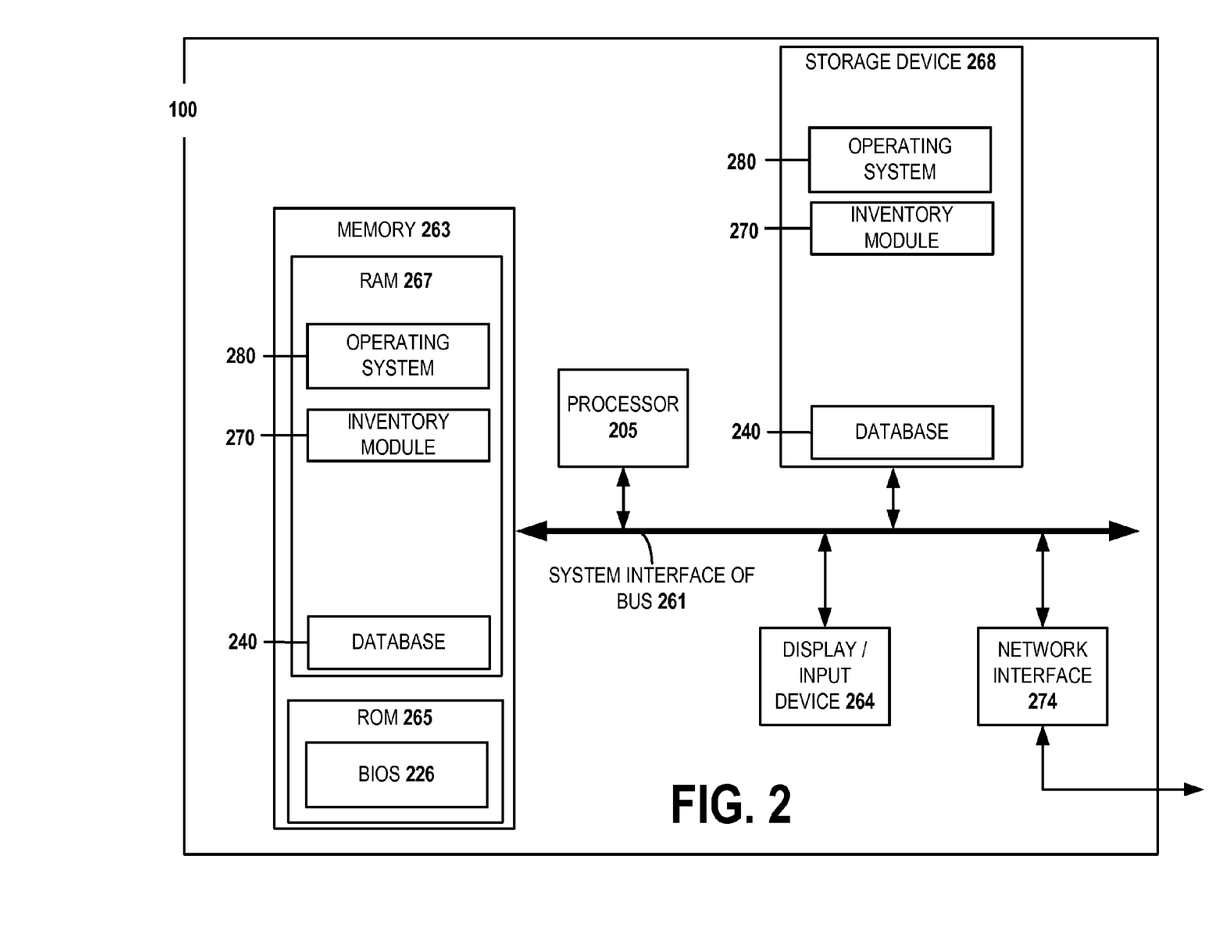
FIG. 2 is an exemplary schematic diagram of a server according to one embodiment of the present invention.

FIG. 2 provides a schematic of a server 100 according to one embodiment of the present invention. In general, the term "server" may refer to, for example, any computer, computing device, mobile phone, desktop, notebook or laptop, distributed system, server, blade, gateway, switch, processing device, or combination of processing devices adapted to perform the functions described herein. As will be understood from this figure, in one embodiment, the server 100 may include a processor 205 that communicates with other elements within the server 100 via a system interface or bus 261. The processor 205 may be embodied in a number of different ways. For example, the processor 205 may be embodied as a processing element, a coprocessor, a controller or various other processing devices including integrated circuits such as, for example, an application specific integrated circuit (ASIC), a field programmable gate array (FPGA), a hardware accelerator, or the like.

In an exemplary embodiment, the processor 205 may be configured to execute instructions stored in the device memory or otherwise accessible to the processor 205. As such, whether configured by hardware or software methods, or by a combination thereof, the processor 205 may represent an entity capable of performing operations according to embodiments of the present invention when configured accordingly. For example, the server 100 can be used to track items in storage locations 100 and update inventory information accordingly. A display device/input device 264 for receiving and displaying data may also be included in the server 100. This display device/input device 264 may be, for example, a keyboard or pointing device that is used in combination with a monitor. The server 100 may further include transitory and non-transitory memory 263, which may include both random access memory (RAM) 267 and read only memory (ROM) 265. The server's ROM 265 may be used to store a basic input/output system (BIOS) 226 containing the basic routines that help to transfer information to the different elements within the server 100.

In addition, in one embodiment, the server 100 may include at least one storage device 268, such as a hard disk drive, a CD drive, and/or an optical disk drive for storing information on various computer-readable media. The storage device(s) 268 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, or the like. Additionally, each of these storage devices 268 may be connected to the system bus 261 by an appropriate interface.

Furthermore, a number of program modules may be stored by the various storage devices 268 and/or within RAM 267. Such program modules may include an operating system 280 and an inventory module 270. As discussed in more detail below, the inventory module 270 may control certain aspects of the operation of the server 100 with the assistance of the processor 205 and operating system 280—although its functionality need not be modularized. Additionally, the server 100 may store or be in communication with one or more databases, such as database 240.

In one embodiment, the server 100 may also include a network interface 274 for interfacing with various computing entities. This communication may be via the same or different wired or wireless networks (or a combination of wired and wireless networks), as discussed above. For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the server 100 may be configured to communicate via wireless external communication networks using any of a variety of protocols, such as 802.11, general packet radio service (GPRS), Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), IEEE 802.11 (Wi-Fi), 802.16 (WiMAX), ultra wideband (UWB), infrared (IR) protocols, Bluetooth™ protocols, wireless universal serial bus (USB) protocols, and/or any other wireless protocol.

It will be appreciated that one or more of the server's 100 components may be located remotely from other server 100 components. Furthermore, one or more of the components may be combined and additional components performing functions described herein may be included in the server 100.

2. Exemplary Storage Locations

In one embodiment, storage locations 110 can be used to hold/store/house various items. For example, in health care settings, medications may be held/stored/housed in ADCs. Such medications may be categorized as narcotic or non-narcotic. For security reasons, narcotic medications may require more control than non-narcotic medications. For example, narcotic medications may need to be kept in a locked compartment 305 (always or until moved to a controlled environment such as an operating room) of a storage location 110, such as the storage location 110 shown in FIG. 3. Additionally, certain procedures may require periodically counting the narcotic medications to ensure that none have been lost or stolen. Non-narcotic medications may not require as much control as narcotic medications, but can also be stored in a storage location 110. Thus, depending on the setting and control required for the medications, medications may be held/stored/housed in a variety of storage locations 110. A storage location 110 may be one or more carts, one or more cabinets, one or more bins, one or more drawers, one or more rooms, one or more storage devices, and/or various other types of storage equipment and/or devices. It should be noted, though, that embodiments of the present invention are not limited to health care settings and medications. In fact, embodiments of the present invention may be applied to most any environment for tracking the inventory of items.

Figure 3:
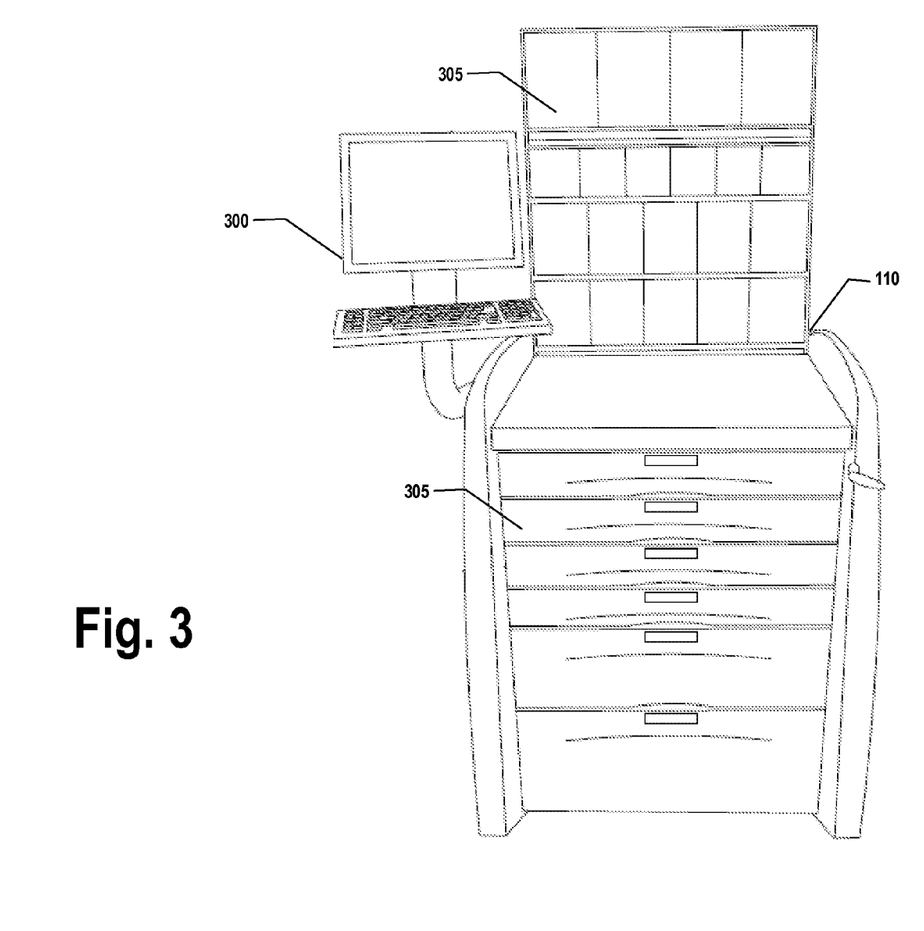
FIG. 3 illustrates a storage location according to an exemplary embodiment of the present invention.

FIG. 3 illustrates an exemplary storage location 110 (e.g., storage location for medications) that may be used in conjunction with embodiments of the present invention. As will be recognized, other types of storage locations 110 storing any of a variety of items may likewise benefit from embodiments of the present invention. As shown in FIG. 3, a storage location 110 may include a computing device 300, which may include components and have functionality similar to that described above with regard to the server 100. For example, the computing device 300 may include a display screen, a keyboard, and/or other input and/or output devices, which are not shown and which may include, for example, a speaker, a barcode reader, a radio frequency identification (RFID) tag reader, and the like.

The computing device 300 may be used to access and/or provide information associated with the items (e.g., medications) and dispensing/delivery devices corresponding to the storage location 110. The computing device 300 may also be used to access and/or provide information regarding the parties (e.g., patients) for whom items may be dispensed from the storage location 110. For example, the computing device 300 may communicate with the server 100 to request information regarding health care patients, as well as provide information regarding the items (e.g., medications) administered.

i. Exemplary Compartments and Containers

In one embodiment, a storage location 110 may include one or more compartments 305 (e.g., drawers, shelves, racks, cabinets, bins, bags, pouches, and/or the like) for storing various items (e.g., medications) and dispensing/delivery devices. For instance, a storage location 110 may be provided with appropriate hardware (not shown) to allow the compartments 305 (e.g., drawers) to slide in and out of the storage location 110. The storage location 110 may also include components for locking and unlocking the compartments 305 of the storage location 110. As will be recognized, a variety of components and/or hardware can be used to adapt to various needs and circumstances.

Figure 4:
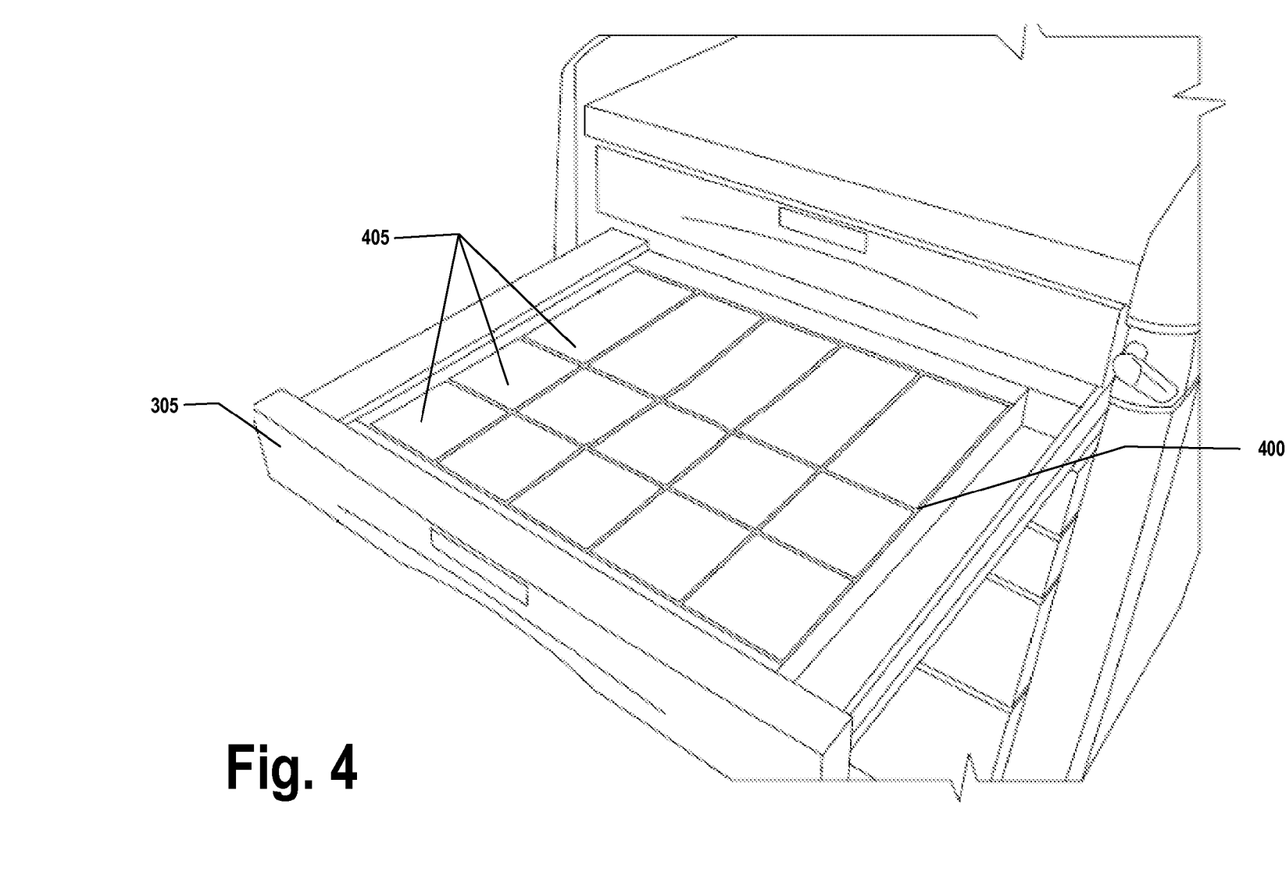
FIG. 4 illustrates a compartment of a storage location and its corresponding container with pockets according to one embodiment of the present invention.
Figure 5:
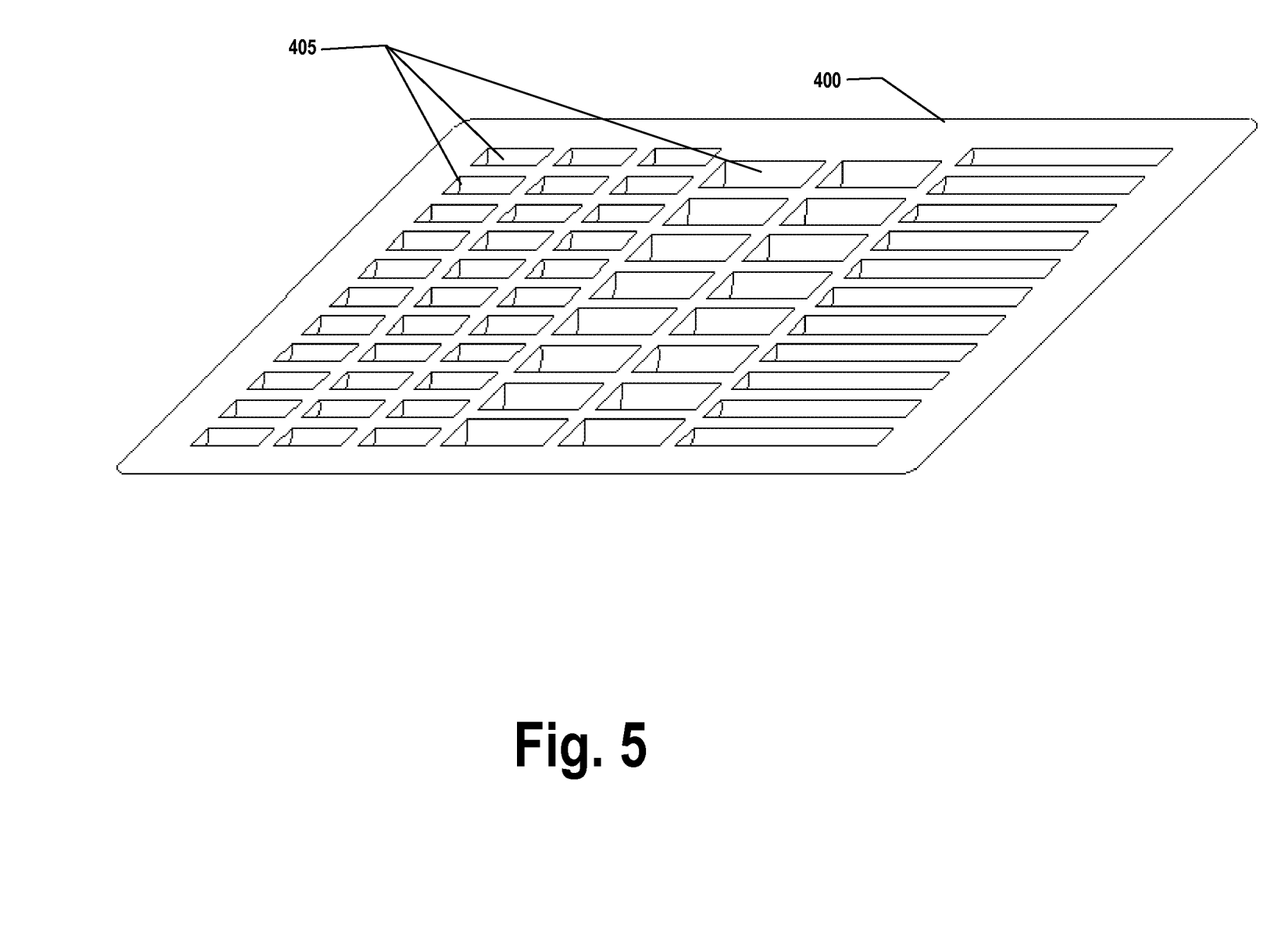
FIG. 5 illustrates a container with pockets according to one embodiment of the present invention.

In one embodiment, each compartment 305 may be adapted to hold/store/house one or more removable and/or permanent containers 400, such as the containers 400 shown in FIGS. 4 and 5. Such containers 400 may be above/on/in the compartment 305, which may include a container 400 abutting a compartment 305. This approach may allow for used, removable containers 400 to be removed and taken back to a pharmacy for refilling and new containers 400 to be put in the appropriate compartment 305. Thus, for instance, a container 400 may be a plastic tray that can be removed from its corresponding compartment 305. Such containers 400 may be off-the-shelf containers that have been configured by a pharmacy. Similarly, other containers 400 may be custom vacuum-formed containers that have pockets 405 for items (shown in FIGS. 4 and 5). In this example, containers 400 (e.g., vacuum-formed trays) can hold/store/house items in individually formed pockets 405. In one embodiment, each individual pocket 405 may by formed to hold a specific type of item (e.g., particular vials and/or ampoules of medications). In another embodiment, each individual pocket 405 may be formed to accommodate a large sampling of items of various shapes and sizes, and not be specific to any particular type of item.

ii. Exemplary Sensing Technologies

As indicated, with one or more items stored in a pocket 405 of a container 400 disposed on, above, or in a compartment 305, a mechanism for automatically detecting when the items are present or absent can be used. To achieve this functionality, various sensors 600 and any corresponding circuitry can be used. The term "circuitry" may refer to (a) hardware-only electrical circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present.

Figure 6:
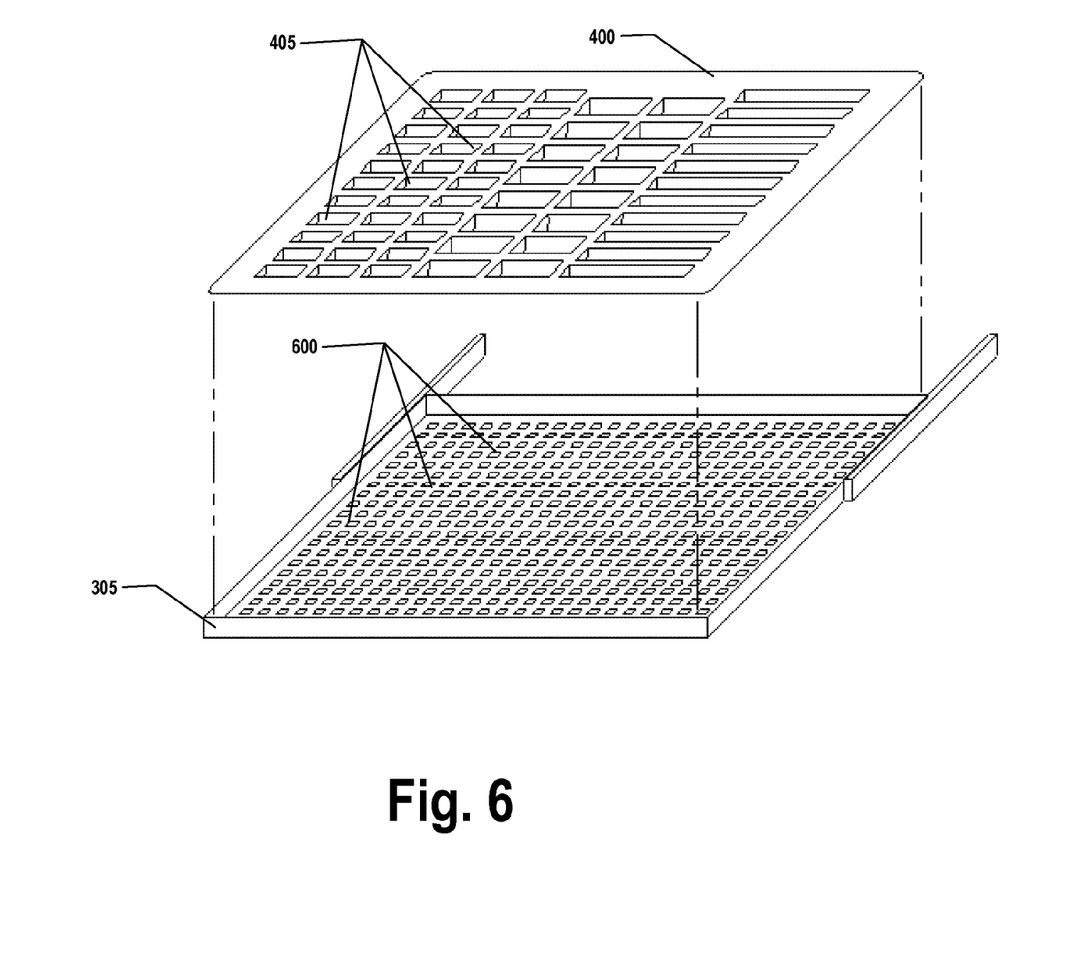
FIG. 6 illustrates a compartment of a storage location and its corresponding sensors and container with pockets according to one embodiment of the present invention.

In one embodiment, as shown in FIG. 6, one or more sensors 600 can be disposed proximate the top of a compartment surface—with a container 400 supported/positioned above the surface (e.g., substantially on top of the surface and/or substantially on top of the sensors 600). For example, the sensors 600 may be directly attached to a compartment surface or metal sheet disposed on top of a compartment surface of a storage location 110. Similarly, the sensors 600 may be part of a printed and/or flexible circuit board of, for example, fiberglass and epoxy material that is disposed on top of a compartment surface. The circuit board or metal sheet may be attached to or placed on a compartment surface—with a container 400 supported/positioned above the surface. In another embodiment, the sensors 600 may be embedded in the surface of a compartment 305. In yet another embodiment, the sensors 600 may be part of a container 400 disposed in the surface of a compartment 305. As will be recognized, a variety of hardware and software components may be used to adapt to various needs and circumstances.

In one embodiment, one or more sensors 600 may correspond to each pocket 405 in a container 400. For example, depending on the size of the sensors 600 and/or the pockets 405 of a container 400, there may be one sensor 600 corresponding to each pocket 405 in a container 400. In another embodiment, there may be multiple sensors 600 corresponding to each pocket 405 in a container 400. Or, there may be any combination of sensors 600 corresponding to pockets 405 in a container 400.

The sensors 600 may routinely, periodically, and/or continually indicate an item is present or absent in each pocket 405. To achieve this functionality, various configurations and types of sensors can be used. For example, in one embodiment, optical sensors (and any corresponding circuitry) can be used. For instance, one or more small optical sensors could be disposed on the sides of each pocket 405 of a container 400—e.g., one or more receivers on one side of each pocket 405 and one or more transmitters on the other side of each pocket 405. In this example, a transmitting sensor's beam could be configured to "shine" through the area that an item would occupy in a pocket 405. Thus, if an item were present in the pocket 405, the transmitting sensor's beam would not shine through to the receiving sensor in that pocket 405. Similarly, if an item were not present in the pocket 405, the transmitting sensor's beam would shine through to the receiving sensor in that pocket 405. These concepts can be used to indicate that a corresponding item is present in or absent from the pocket 405. Such sensors 600 may be integral to the corresponding container 400 (e.g., container for medications). In such an embodiment, the container 400 would be electrically connected or coupled to the compartment 305 in which it is disposed.

In another embodiment, as shown in FIG. 6, reflective sensors (and any corresponding circuitry) can be used. For instance, one or more small reflective sensors could be disposed on the top surface of a compartment 305 of a storage location 110. When the appropriate containers 400 are placed above/on/in the compartment, the reflective sensors may be directly under the pockets 405 (or at least portions thereof) of the container 400. In one embodiment, the containers 400 (and pockets 405 or portions thereof) may be made of a transparent and/or a translucent (to the sensor's light wavelength) material. In another embodiment, the bottom of each pocket 405 of the container 400 may have an opening such that there is nothing between the sensors 600 and the items when the items are placed in the pockets 405. In such an embodiment, the openings of the pockets 405 may be smaller than the overall bottom surfaces of the corresponding pockets 405. As will be recognized, a reflective sensor may include an emitter and phototransistor, for example, in the same housing. Thus, if an item were present in the pocket 405, the reflective sensor's 600 phototransistor could detect radiation from the emitter. Similarly, if an item were not present in the pocket 405, the reflective sensor's 600 phototransistor would not detect radiation from the emitter. These concepts can be used to indicate that a corresponding item is present in or absent from the pocket 405.

In another embodiment, mechanical sensors (and any corresponding circuitry) can be used. For instance, one or more mechanical switch sensors could be used proximate the bottom of each pocket 405. For instance, one or more small mechanical switches could be disposed above, on, or in the top surface of a compartment 305. When the appropriate containers 400 are placed above/on/in the compartment 305, the mechanical switches may be directly under the pockets 405 of the container 400. In this example, the bottom of each pocket 405 of the container 400 may have an opening such that there is nothing between the mechanical switches and the items when the items are placed in the pockets 405. Thus, when an item is present in a pocket 405, the item could directly contact the corresponding mechanical switch (and depress or close the switch). Similarly, if an item were not present in the pocket 405, there would be nothing in the pocket 405 to contact (depress or close) the corresponding mechanical switch. These concepts can be used to indicate that a corresponding item is present in or absent from the pocket 405. In another embodiment, similar to as previously described, the mechanical switches may be integral to the container 400 and be coupled to a compartment 305.

It should be noted, that depending on the configuration/layout of the various containers 400 and corresponding pockets 405, not all sensors 600 may be used in all cases. As will be recognized, various sensors (including infrared sensors, resistive sensors, and/or capacitive touch screen systems), approaches, and techniques can be used with embodiments of the present invention. Accordingly, the foregoing examples are provided for illustrative purposes only and should not be taken in any way as limiting embodiments of the present invention to the examples provided.

iii. Exemplary Arrangement of Sensors and Container Identifiers

As described, one or more sensors 600 can be disposed above/on/in a compartment surface of a storage location 110 for positioning, for example, under a container 400. For each container 400, there may be one sensor 600 for each pocket 405, multiple sensors for each pocket 405, and/or combinations thereof. The sensors 600 can be arranged in a variety of configurations. For example, as shown in FIG. 6, the sensors 600 can be arranged in a grid format, such as an X-Y grid format. In this example, (X, Y) may correspond to the different positions of the grid. For example, position (A, 1) may correspond to a single sensor 600 for a single pocket 405. Similarly, positions (A, 1)-(A, 5) may correspond to multiple sensors 600 for a single pocket 405.

In one embodiment, the positions of the sensors 600 may be scaled similarly. In other words, one unit of physical distance along the X-Axis may be equal in length to one unit of physical distance along the Y-Axis. For example, the sensors 600 may correspond to a 4×8 grid. Thus, based on their position, each sensor 600 may be associated with a point on the grid, such as (A, 1)-(A, 8), (B, 1)-(B, 8), (C, 1)-(C, 8), or (D, 1)-(D, 8). In another embodiment, the positions of the sensors 600 may be scaled differently, such that one unit of physical distance along the X-Axis is not equal in length to one unit of physical distance along the Y-Axis.

In one embodiment, each container 400 may be associated with a container identifier (e.g., an alphanumeric identifier) and corresponding mapping information (e.g., the configuration/layout of items in the container 400). For example, a specific item configuration/layout for a container 400 may be associated with a container identifier, such as container identifier "137." The container identifier (e.g., 137) may identify the types, locations, and/or quantities (including dosage and concentration) of items (e.g., medications) in a container 400.

In one embodiment, for redundancy, the mapping information for the various containers 400 may be stored in the computing device 300 of each storage location 110 and the server 100. In another embodiment, each time a container 400 is placed in a storage location 110, the appropriate computing device 300 may retrieve the mapping information for the container 400 from the server 100. In still another embodiment, a computing device 300 may retrieve the mapping information from the server 100 for any given container 400 on an as-needed basis.

In one embodiment, the container identifier may be used to map the sensors 600 (e.g., sensor positions) of a single type of compartment 305 (e.g., a compartment 305 with a 4×8 grid of sensors 600) to the items stored in the pockets 405 of the corresponding type of container 400. For example, container identifier "137" may map a 4×8 grid of sensors 600 to the following items (e.g., medications) stored in the pockets 405 of the corresponding type of container 400: (A, 1)-(A, 4) correspond to a vial of Propofol; (A, 5)-(A, 8) correspond to a vial of Propofol; (B, 1)-(B, 4) correspond to an ampoule of Sodium Thiopental; (B, 5)-(B, 8) correspond to an ampoule of Sodium Thiopental; (C, 1)-(C, 4) correspond to an ampoule of Fentanyl; (C, 5)-(C, 8) correspond to an ampoule of Fentanyl; (D, 1)-(D, 2) correspond to an ampoule of Desflurane; and (D, 3)-(D, 8) correspond to an ampoule of Midazolam.

In another embodiment, the container identifier may be used to map the sensors 600 (e.g., sensor positions) of multiple types of compartments 305 (e.g., a compartment 305 with a 4×8 grid of sensors 600 and/or a compartment 305 with an 8×16 grid of sensors 600) to the items stored in the pockets 405 of the corresponding type of container 400. For example, container identifier "137" may map a 4×8 grid of sensors 600 to the items as described above. Similarly, container identifier "137" may also map an 8×16 grid of sensors 600 to the items stored in the container 400. For instance, container identifier "137" may map an 8×16 grid of sensors 600 to the following items (e.g., medications) stored in the pockets 405 of the corresponding type of container 400: (A, 1)-(A, 8) correspond to a vial of Propofol; (A, 9)-(A, 16) correspond to a vial of Propofol; (B, 1)-(B, 8) correspond to an ampoule of Sodium Thiopental; (B, 9)-(B, 16) correspond to an ampoule of Sodium Thiopental; (C, 1)-(C, 8) correspond to an ampoule of Fentanyl; (C, 9)-(C, 16) correspond to an ampoule of Fentanyl; (D, 1)-(D, 4) correspond to an ampoule of Desflurane; and (D, 5)-(D, 16) correspond to an ampoule of Midazolam. As will be recognized, depending on the configuration/layout of the various containers 400 and corresponding pockets 405, not all sensors 600 would be used in all cases and various sensor configurations and mappings can be used with embodiments of the present invention.

Figure 7:
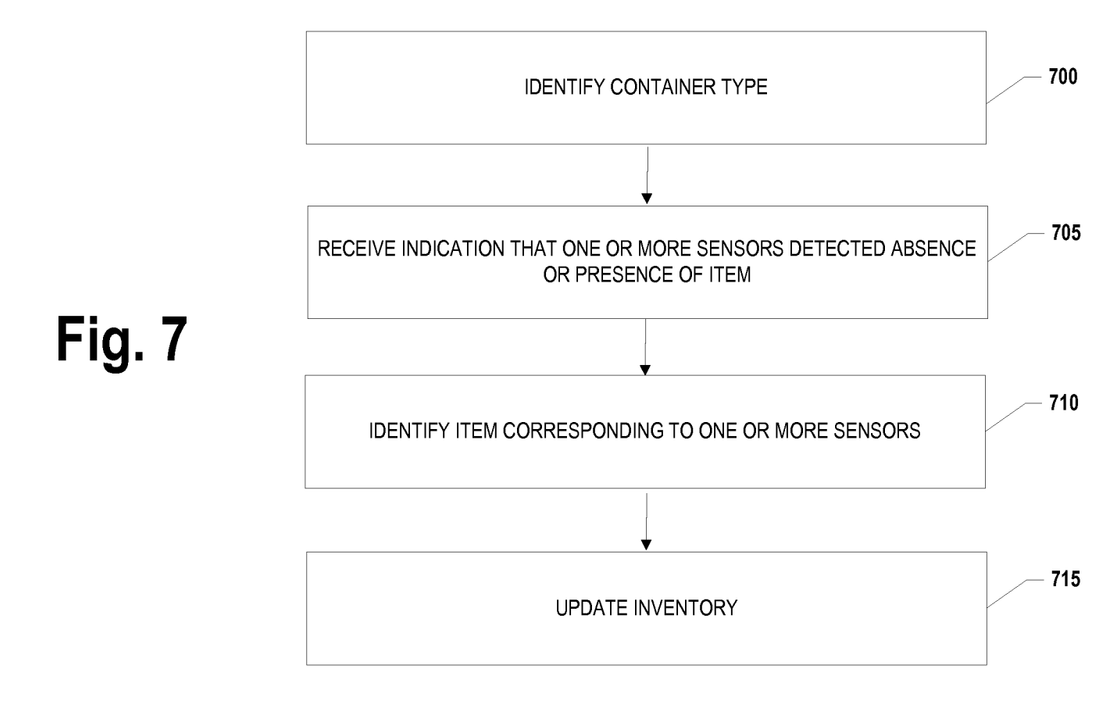
FIG. 7 is a flowchart illustrating operations and processes that can be used in accordance with various embodiments of the present invention.

In one embodiment, the computing device 300 of each storage location 110 can be used to receive input identifying the container identifiers using a variety of techniques and approaches (Block 700 of FIG. 7). For example, in one embodiment, a medication technician could input (e.g., via operation of the computing device 300) the container identifiers for any containers 400 stored within any compartments 305 of a storage location 110.

In another embodiment, each container 400 may comprise a machine readable barcode or RFID tag, for example, that can be used to identify the various container identifiers. For example, a computing device 300 of each storage location may include (or have associated devices with) the capability to read barcodes and/or interrogate RFID tags. Thus, when a medication technician replaces a container, he or she could scan the barcode or interrogate the RFID tag on the container 400. Additionally or alternatively, each compartment 305 may include such capabilities.

In yet another embodiment, the sensors 600 may be used to identify the type of container 400 and the corresponding items stored therein. In this example, each container 400 may include a feature that allows the various sensors 600 on the grid to determine the type of container 400 that is above the surface. For instance, each container 400 may include an identification area (e.g., a pattern of holes, opaque surfaces, and/or reflective surfaces) that can be detected by the sensors 600 and interpreted by a computing device 300 of a storage location 110 as corresponding to a specific container identifier. As will be recognized, a variety of approaches and techniques can be used to adapt to various needs and circumstances.

3. Exemplary Inventory Tracking

As described, a computing device 300 of a storage location 110 (e.g., storage location for medications) can identify the types of containers 400 stored above the surfaces of various compartments 305 in the storage location 110. With a container 400 disposed above the sensors 600, the sensors 600 can be used to track the inventory of items in the container 400. For example, when an item (e.g., a medication) is removed from a pocket 405 of a container 400, the one or more sensors 600 corresponding to the pocket 405 may detect that the item is absent. Similarly, when an item (e.g., a medication) is placed in a pocket 405 of a container 400, the one or more sensors 600 corresponding to the pocket 405 may detect that the item is present. Illustrative sensors and their corresponding detection features are described in greater detail above.

In one embodiment, a computing entity (e.g., the computing device 300 for that storage location 110 or the server 100) may receive an indication that the one or more sensors 600 detect the presence or absence of an item (Block 705 of FIG. 7). For example, in one embodiment, the indication that the one or more sensors 600 detected the absence of an item may be received by the computing entity promptly (e.g., with no delay or a minor delay) after the detection. In another embodiment, the indication that the one or more sensors 600 detected the absence of an item may only be received by the computing entity, for example, once the corresponding compartment 305 is closed. In yet another embodiment, the indication that the one or more sensors 600 detected the absence of an item may be received by the computing entity, for example, in response to the computing entity routinely, periodically, and/or continuously polling the sensors 600. In still another embodiment, the indication that the one or more sensors 600 detected the absence of an item may be received by the computing entity (a) promptly (e.g., with no delay or a minor delay) after detection and (b) again once the corresponding compartment 305 is closed. Such an adaptation may be used to account for items that are removed from a pocket 405 of a container 400, but returned to the pocket 405 before the compartment 305 is closed, for example. As will be recognized, a variety of other approaches and techniques may also be used.

In response to (e.g., after) receiving an indication that the one or more sensors detected the presence or absence of an item, the computing entity (e.g., the computing device 300 for that storage location 110 or the server 100) can identify, for example, the item corresponding to the detection (Block 710 of FIG. 7). This identification may involve using the mapping information associated with the appropriate container identifier. For instance, if sensors (A, 1)-(A, 4) of a 4×8 grid detected the absence of an item and the corresponding container 400 is associated with container identifier "137," the computing entity can determine that the item that was removed (e.g., now absent from the pocket 405) was a vial of Propofol. Similarly, the computing entity can determine that the item that was placed in the container (e.g., now present in the pocket 405) was a vial of Propofol. Based on the mapping information, for instance, the computing entity may also determine any relevant dosage and concentration information for the Propofol. In one embodiment, the computing entity may also identify the time at which the one or more sensors 600 detected the absence or presence to indicate the time the item was (a) removed (e.g., detected as being absent from the pocket 405) from the container 400 or (b) placed in the container 400 (e.g., detected as being present in the pocket 405).

In one embodiment, a computing entity (e.g., a computing device 300 for a storage location 110) may implement one or more confirmation measures in response to an item being removed. For example, each time one or more sensors 600 detect the absence of an item, the computing entity, via its display, may cause display of information regarding the item that was removed from the container 400. For example, the display may provide text that reads "A vial of Propofol was just removed." In one embodiment, the display (e.g., a touch screen) may also prompt the user to input a confirmation that he or she removed the identified item from the container 400. As will be recognized, a variety of other approaches and techniques may also be used.

In one embodiment, in response to (e.g., after) identifying the item corresponding to the detection, the computing entity (e.g., the computing device 300 for that storage location 110 or the server 100) can update the appropriate inventory to indicate that the item is now absent from or present in the container (Block 715 of FIG. 7). For example, the computing device 300 for that storage location 110 may update a local copy of the inventory and transmit information to the server 100 that can be used to update a master copy of the inventory (e.g., via the inventory module 270). Updating the inventory may also include storing information about the date and time the item was removed from or placed in the container 400 (e.g., the date and time of the initial detection). Additional information stored via the update may include the user of the storage location 110 at the time the item was removed, as well as a variety of other information. In one embodiment, the updated inventory can be used to notify restocking locations and/or devices as to when a storage location 110, compartment 305, and/or container 400 may need to be restocked. In various embodiments, these features may provide for a "zero count" or a "no count" solution. Such solutions may reduce errors and provide for increased efficiency and productivity in a variety of environments.

In a particular application, embodiments of the present invention may enable the use of an anesthesia cart (e.g., storage location 110) to determine when an anesthesiologist takes a particular item from one of its containers 400. For example, when an item is removed from one of the anesthesia cart's (e.g., storage location's 110) containers 400, the item inventory can be updated to reflect the administration of the item. This may include identifying the anesthesiologist who administered the item and the patient who received it. This information can also be used to update, for example, the patient's record to indicate the items (e.g., medications) administered to the patient (including dosages and/or concentrations) and the times they were administered. In various embodiments, these features may be used for billing purposes so that the appropriate patient is billed for all of the medications that are actually used for the patient. As previously noted, though, embodiments of the present invention may be applied to most any environment for tracking the inventory of items.

III. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for tracking the inventory of one or more items, the method comprising:
providing a compartment comprising a plurality of sensors disposed proximate a surface of the compartment;
disposing a container above the surface, wherein the container (a) comprises a plurality of pockets with each pocket adapted for storing one or more items, (b) is supported by the compartment, and (c) is associated with a container identifier, the container identifier corresponding to a layout of the one or more items in the respective pockets of the container, the layout identifying each of the plurality of pockets of the container to which each of the plurality of sensors correspond; and
receiving an indication that at least one sensor of the plurality of sensors detected the absence of at least one of the one or more items from the container.

2. The method of claim 1 further comprising:
receiving input identifying the container identifier associated with the container; and
identifying the layout of the one or more items for the container based at least in part on the container identifier, wherein the layout identifies the respective pockets of the container to which each of the plurality of sensors correspond.

3. The method of claim 2 further comprising:
identifying the at least one item corresponding to the at least one sensor; and
after identifying the at least one item corresponding to the at least one sensor, decrementing the inventory to indicate that the at least one item is absent from the container.

4. The method of claim 2, wherein the input identifying the container identifier is received by at least one selected from the group consisting of: (a) interrogation of a radio frequency identification (RFID) tag; (b) scan of a barcode; (c) manual input from a user of a computing device; and (d) identification from one or more of the plurality of sensors.

5. The method of claim 1, wherein the one or more items are medications.

6. The method of claim 5 further comprising:
identifying the time at which the at least one sensor detected the absence of the at least one item, wherein the time indicates the time at which the at least one item was removed from the container for administration to a patient; and
updating a patient record to indicate that a medication was administered to the patient and the estimated time at which the medication was administered.

7. The method of claim 1 further comprising receiving an indication that the at least one sensor detected the presence of the at least one item in the container.

8. An apparatus for tracking the inventory of one or more items, the apparatus comprising:
a compartment comprising a plurality of sensors disposed proximate a surface of the compartment, wherein (a) a container is disposed above the surface and (b) the container (i) comprises a plurality of pockets with each pocket adapted for storing one or more items, (ii) is supported by the compartment, and (iii) is associated with a container identifier, the container identifier corresponding to a layout of the one or more items in the respective pockets of the container, the layout identifying each of the plurality of pockets of the container to which each of the plurality of sensors correspond; and
at least one processor and at least one memory including computer program code, the at least one memory and the computer program code configured to, with the processor, cause the apparatus to at least receive an indication that at least one sensor of the plurality of sensors detected the absence of at least one of the one or more items from the container.

9. The apparatus of claim 8, wherein the memory and computer program code are further configured to, with the processor, cause the apparatus to:

receive input identifying the container identifier associated with the container; and identify the layout of the one or more items for the container based at least in part on the container identifier, wherein the layout identifies the respective pockets of the container to which each of the plurality of sensors correspond.

10. The apparatus of claim 9, wherein the memory and computer program code are further configured to, with the processor, cause the apparatus to:

identify the at least one item corresponding to the at least one sensor; and after identifying the at least one item corresponding to the at least one sensor, decrement the inventory to indicate that the at least one item is absent from the container.

11. The apparatus of claim 9, wherein the input identifying the container identifier is received by at least one selected from the group consisting of: (a) interrogation of a radio frequency identification (RFID) tag; (b) scan of a barcode; (c) manual input from a user of a computing device; and (d) identification from one or more of the plurality of sensors.

12. The apparatus of claim 8, wherein the one or more items are medications.

13. The apparatus of claim 12, wherein the memory and computer program code are further configured to, with the processor, cause the apparatus to:

identify the time at which the at least one sensor detected the absence of the at least one item, wherein the time indicates the time at which the at least one item was removed from the container for administration to a patient; and update a patient record to indicate that a medication was administered to the patient and the estimated time at which the medication was administered.

14. The apparatus of claim 8, wherein the memory and computer program code are further configured to, with the processor, cause the apparatus to receive an indication that the at least one sensor detected the presence of the at least one item in the container.

15. A computer program product for tracking the inventory of one or more items, the computer program product comprising at least one non-transitory computer-readable storage medium having computer-readable program code portions stored therein, the computer-readable program code portions comprising:

an executable portion configured to receive an indication that at least one sensor of a plurality of sensors detected the absence of at least one of one or more items from a container, wherein (a) a compartment comprises the plurality of sensors disposed proximate a surface of the compartment, and (b) a container is disposed above the surface, the container (i) comprising a plurality of pockets with each pocket adapted for storing one or more items, (ii) being supported by the compartment, and (iii) being associated with a container identifier, the container identifier corresponding to a layout of the one or more items in the respective pockets of the container, the layout identifying each of the plurality of pockets of the container to which each of the plurality of sensors correspond.

16. The computer program product of claim 15 further comprising:

an executable portion configured to receive input identifying the container identifier associated with the container; and an executable portion configured to identify the layout of the one or more items for the container based at least in part on the container identifier, wherein the layout identifies the respective pockets of the container to which each of the plurality of sensors correspond.

17. The computer program product of claim 16 further comprising:

an executable portion configured to identify the at least one item corresponding to the at least one sensor; and an executable portion configured to, after identifying the at least one item corresponding to the at least one sensor, decrement the inventory to indicate that the at least one item is absent from the container.

18. The computer program product of claim 16, wherein the input identifying the container identifier is received by at least one selected from the group consisting of: (a) interrogation of a radio frequency identification (RFID) tag; (b) scan of a barcode; (c) manual input from a user of a computing device; and (d) identification from one or more of the plurality of sensors.

19. The computer program product of claim 15, wherein the one or more items are medications.

20. The computer program product of claim 19 further comprising:

an executable portion configured to identify the time at which the at least one sensor detected the absence of the at least one item, wherein the time indicates the time at which the at least one item was removed from the container for administration to a patient; and an executable portion configured to update a patient record to indicate that a medication was administered to the patient and the estimated time at which the medication was administered.

21. The computer program product of claim 15 further comprising an executable portion configured to receive an indication that the at least one sensor detected the presence of the at least one item in the container.

* * * * *